March 8, 1966  R. J. VAN DE GRAAFF  3,239,702
MULTI-DISK ELECTROMAGNETIC POWER MACHINERY
Filed June 29, 1960  6 Sheets-Sheet 1

Fig.1

March 8, 1966   R. J. VAN DE GRAAFF   3,239,702
MULTI-DISK ELECTROMAGNETIC POWER MACHINERY
Filed June 29, 1960   6 Sheets-Sheet 2

March 8, 1966   R. J. VAN DE GRAAFF   3,239,702
MULTI-DISK ELECTROMAGNETIC POWER MACHINERY
Filed June 29, 1960   6 Sheets-Sheet 3

March 8, 1966  R. J. VAN DE GRAAFF  3,239,702
MULTI-DISK ELECTROMAGNETIC POWER MACHINERY
Filed June 29, 1960  6 Sheets-Sheet 4

March 8, 1966      R. J. VAN DE GRAAFF      3,239,702

MULTI-DISK ELECTROMAGNETIC POWER MACHINERY

Filed June 29, 1960

United States Patent Office 3,239,702
Patented Mar. 8, 1966

3,239,702
MULTI-DISK ELECTROMAGNETIC
POWER MACHINERY
Robert J. Van de Graaff, Lexington, Mass., assignor to High Voltage Engineering Corporation, Burlington, Mass., a corporation of Massachusetts
Filed June 29, 1960, Ser. No. 39,539
15 Claims. (Cl. 310—168)

This invention relates to electromagnetic power machinery, such as generators, motors, and electro-mechanical control devices, and involves the conversion of mechanical energy into electrical energy and vice versa. However, in order to simplfy the discussion, the invention will be described with particular reference to electromagnetic generators, it being understood that the principles of the invention can be applied very readily to motors and electro-mechanical control devices.

In particular, the invention comprehends electromagnetic machinery (such as a generator, motor, or electro-mechanical control device) having a rotatable shaft upon which a series of axially spaced disks are mounted, and also an elongated magnetic circuit, or circuits, lying generally parallel and close to the shaft, so that the magnetic flux lines (except for leakage) of the magnetic circuit are intersected by the disks. The detailed arrangements can be more immediately visualized by inspection of FIGURES 1 through 4, which show one particular embodiment of the general principles of the invention. The magnetic circuit is defined by magnetic material such as iron, steel, ferrites, etc. which is arranged about the shaft and between the disks so as to insure that the magnetic circuit lies generally parallel and close to the shaft, as required. Into this magnetic circuit are introduced certain discontinuities, such as gaps between rotating and stationary parts, layers of insulating material, and the disks which, as will be noted hereinafter, include magnetic sectors. None of these discontinuities break the magnetic flux lines, but they do introduce additional reluctance into the magnetic circuit. The magnetic lines of force are in one direction in a certain region or regions and in the opposite direction in certain other regions, and the magnetic circuit or circuits are closed at each end by a comparatively short curved portion of magnetic material. The disks include sectors of magnetic material which are carried by the disks in angularly spaced relationship and which extend axially through the thickness of the disk. Those transverse surfaces of the magnetic circuit which lie adjacent the surfaces of the disks are provided with a similar set of angularly spaced magnetic sectors so that, in any given region of the magnetic circuit or circuits, rotary motion of the disks will cause the moving sectors and the stationary sectors to alternate between positions of juxtaposition and of non-juxtaposition.

A magnetic field is maintained in the magnetic circuit by sources of magnetomotive force which may be either held by the disks or held in the spaces between the disks, depending upon whether the device is to operate as a moving pole or as an inductor machine. Each source of magnetomotive force may comprise either a field coil or permanent magnetic material. In cases where the machinery is to operate as a generator, armature coils are placed between the disks in planes at right angles to the magnetic lines of force and surrounding them in order to carry the output current. If direct-current output is desired, rectifiers may be placed in the armature coils in the intervals between the disks. The machinery of the invention is particularly adapted to make use of the advantages of "rectify-as-you-go" techniques, wherein the output alternating current is rectified in small increments and not as a whole.

The invention is not limited to any particular type of variation in the magnetic flux. For example, a moving-pole type of generator generally produces a magnetic flux which reverses direction so as to provide maximum amplitude. Inductor generators generally provide a unidirectional magnetic flux which may either pulsate (that is, vary in intensity with time), or swing back and forth through a certain arc, or rotate around the axis of the generator. In the generator of the present invention, these variations may be accomplished by judicious arrangement of the magnetic circuit or circuits and of the magnetic sectors and of the armature coils. When the moving sectors and the stationary sectors are in juxtaposition, the magnetic flux in that portion of the magnetic circuit is at a maximum, and the magnetic flux decreases as the moving sectors move out of juxtaposition with the stationary sectors.

In general, the shaft and disks mounted thereon will rotate while the rest of the apparatus will be stationary. However, it will be apparent that the apparatus would also function if the rest of the apparatus were to rotate in the opposite sense from that of the shaft rotation, or if the shaft were stationary and rotation imparted to the rest of the apparatus.

The generator of the invention is well adapted to the production of high power and may be used to advantage in either high or low voltage applications. In general, the generator which has just been described is well suited for low voltage applications such as D.C. power for electrolysis. However, where high voltage is to be generated, as for the transmission of power or for the acceleration of charged particles, the generator is preferably modified by the introduction into the magnetic circuit of insulating layers in accordance with the teachings of my copending application, Serial Number 647,915, now abandoned.

Broadly stated, the invention involves the use of one or more magnetic circuits for the conversion of energy between mechanical and electrical forms and is characterized by the introduction into each of the magnetic circuits of not one but more than one and possibly very many moving mechanical elements, so that the mechanical energy involved in the conversions process is introduced into as much of the magnetic circuit as possible. In one embodiment of the invention, the moving mechanical elements are electrically insulated from one another by the introduction of transverse insulating layers into the magnetic circuit. An important feature of the invention is the introduction of magnetomotive force into the magnetic circuit at frequent intervals, so that it is possible to deal with the added reluctance which is introduced by the insulating layers and by the gaps between relatively moving parts. Moreover, the invention also comprehends the similar introduction of armature coils linking the magnetic circuit at frequent intervals, so that each armature coil links a portion of the magnetic circuit having an electrical potential near that of the armature coil.

The invention may best be understood from the following detailed description thereof, having reference to the accompanying drawing, in which.

Figure 1:
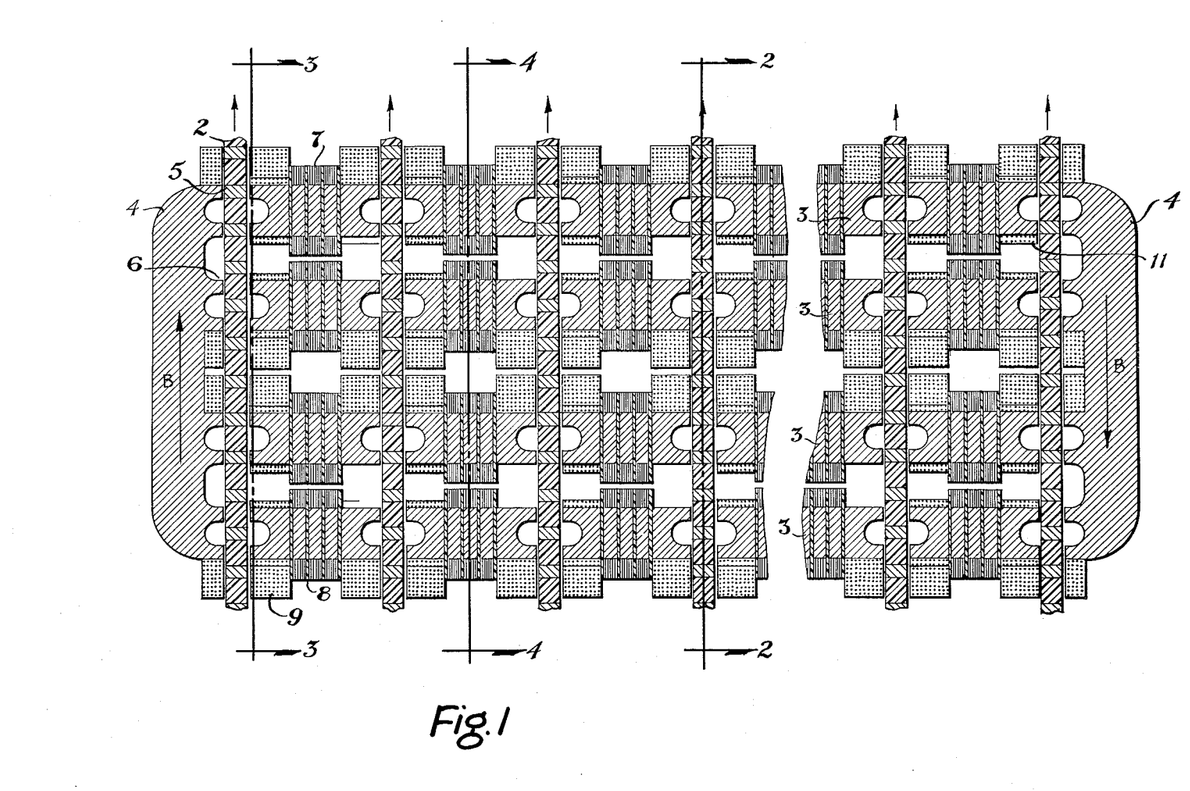
FIG. 1 is a cylindrical section (unrolled) of a multi-disk inductor generator embodying the principles of the invention.
Figure 2:
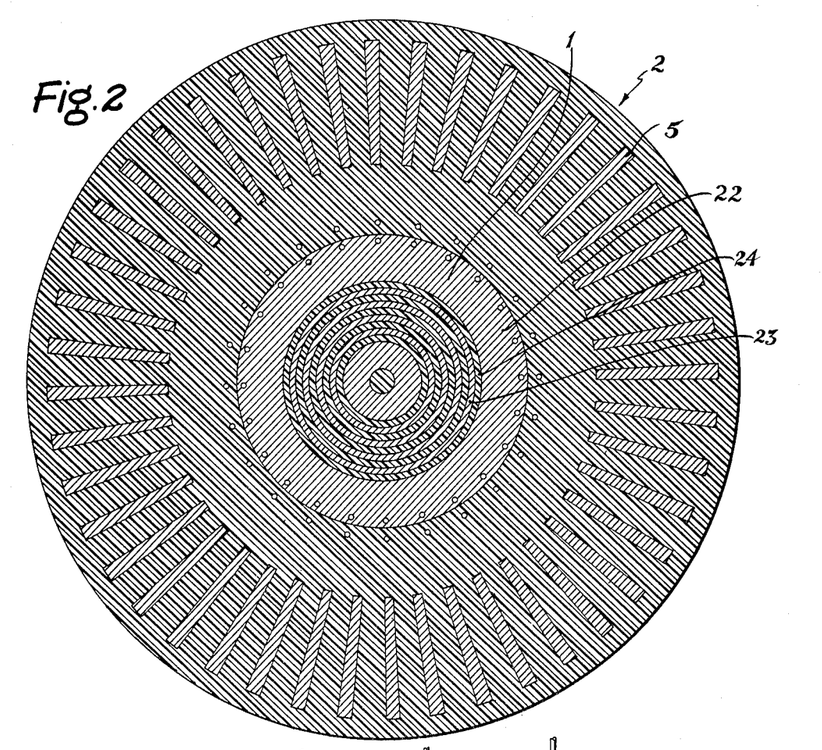
FIG. 2 is a section of the rotor, including the shaft, of the generator of FIG. 1 and is taken along the line 2—2 of FIG. 1.
Figure 3:
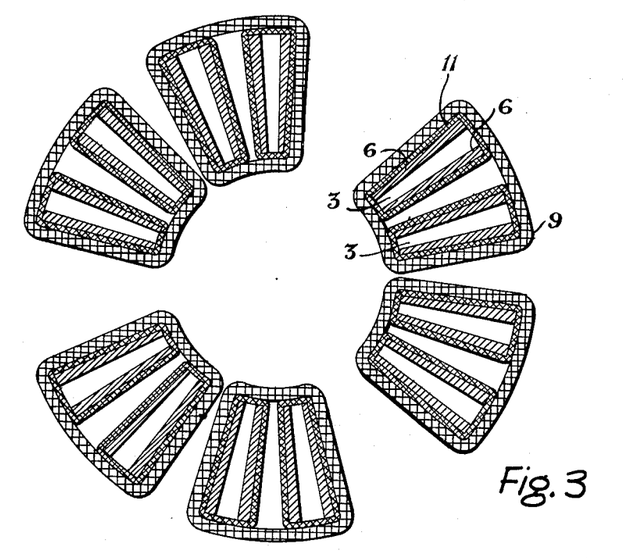
FIG. 3 is a section through the stator teeth of the generator of FIG. 1 and is taken along the line 3—3 of FIG. 1.
Figure 4:
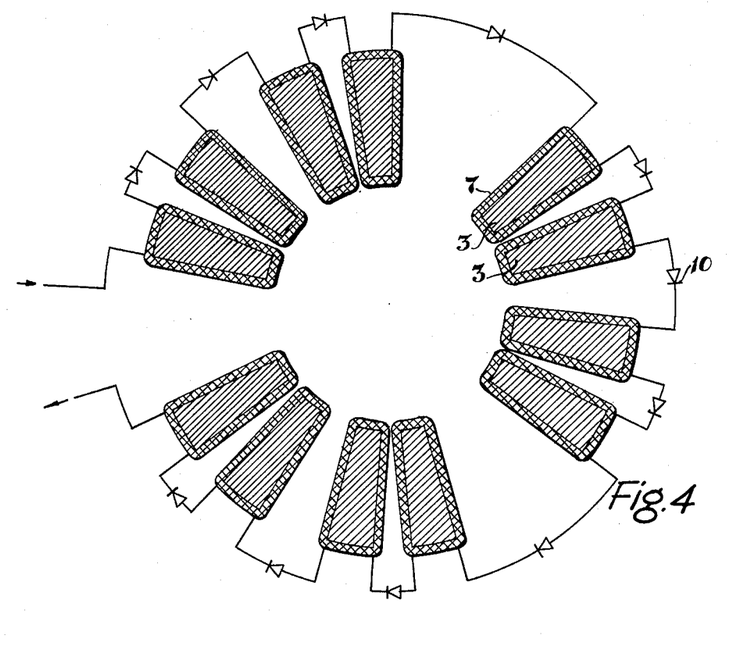
FIG. 4 is a section through the armature of the generator of FIG. 1 and is taken along the line 4—4 of FIG. 1.

Referring to the drawings and first to FIGS. 1 through 4 thereof, the generator therein shown includes a shaft 1 upon which are mounted a plurality of disks 2. The apparatus of FIGS. 1 through 4 includes three magnetic circuits of which one is shown in FIG. 1 and comprises pairs of stators 3 and end pieces 4. Two pairs of stators 3 are arranged between each pair of adjacent disks 2, the direction of the magnetic flux being in one direction in one such pair of stators 3 and in the opposite direction in the other such pair of stators 3 at all times. Within each disk 2 there are mounted sectors 5 of magnetic material which are angularly spaced in symmetry about the axis of the shaft 1. The rest of the disk 2 may be of insulating material in order to reduce eddy-current losses and may comprise, for example, laminated fiber glass. The transverse surfaces of the stators 3 and the end pieces 4 which face the transverse surface of a disk 2 are provided with sector-shaped teeth 6 the end surfaces of which are shaped to correspond with the sectors 5 in the disks 2. The teeth 6 are angularly spaced about the axis of the shaft 1 but not in symmetry; instead, the teeth 6 of the two pairs of stators 3 between each adjacent pair of disks 2 in each magnetic circuit are angularly displaced in such a manner that when sectors 5 in the disks 2 are in alignment with the teeth 6 of one stator 3 in each pair, there are no sectors 5 in alignment with the teeth 6 of the other stator 3 in each pair. Thus, as the shaft 1 rotates, the magnetic flux in the magnetic circuit "swings" back and forth between the two stators 3 in each pair. The sectors 5 of each disk 2 are in alignment with those of the other disks 2, and the teeth 6 of each stator 3 are in alignment with those of stators 3 which are axially but not angularly displaced with respect thereto.

Armature coils 7 are wound about the individual stators 3, so that the magnetic flux which they link varies as the magnetic flux swings from one stator 3 to the other in each pair. An electromotive force is thus produced in each armature coil 7. For the generation of high voltage, layers 8 of insulating material such as Mylar are introduced into the magnetic circuit in accordance with the teachings of my copending application, Serial Number 647,915, now abandoned. As shown in FIGS. 1–4, four such layers 8 are introduced into each stator 3 and serve electrically to separate three armature coils 7 and two field coils 9 (to be described hereinafter). Each armature coil 7, together with any rectification or other apparatus intimately associated therewith, is therefore electrically independent of the rest of the apparatus and comprises a power unit; and if, for example, such armature coil 7 is adapted to generate 10 kilovolts, it may be designed as if the only problem were the generation of 10 kilovolts, without reference to the rest of the apparatus. Since these power units are substantially identical it should be noted that they can be efficiently operated either in series for high voltage, or in parallel for low voltage, or in series-parallel combinations for intermediate voltages. If, now, the armature coils 7 between adjacent disks 2 are all connected in a helical manner in series, so that the bottom armature coil 7 of one stator 3 is connected in series with the bottom armature coil 7 of the adjacent stator 3 and so on through twelve stators and then through the middle armature coils 7 of the same twelve stators and thence through the upper armature coils 7 of the same twelve stators, it will be seen that 360 kilovolts can be generated between each pair of adjacent disks 2, and the output of the whole generator will then be $360(n-1)$ kilovolts, where $n$ is the number of disks 2.

If a direct-current output is desired, one or more rectifiers 10 may be connected in series with each armature coil 7, so that each such rectifier system 10 need handle only 10 kilovolts in the above example. Voltage fluctuations may be reduced by displacing the phase of each magnetic circuit with respect to those of the other two; as shown in FIGS. 1–4, such phase displacement is accomplished in the following manner: instead of placing the three magnetic circuits symmetrically about the axis of the shaft 1, the teeth 6 of the sectors 3 of two of the three magnetic circuits are angularly displaced a small amount in mutually opposite senses. A similar angular displacement in a similar generator having no rectifiers results in three-phase A.C. output.

Magnetomotive force is introduced into each magnetic circuit by means of the field coils 9. In accordance with the invention, these field coils 9 are provided at frequent intervals along the magnetic circuit, and, in this way, it becomes possible to cope with the reluctance which is introduced into the magnetic circuit by the insulating layers 8 and by the gaps between the disks 2 and the stators 3 and end pieces 4. The voltage source to energize the field coils 9 may be derived from the output of excitation coils 11 in accordance with principles well known in the art.

Figure 5:
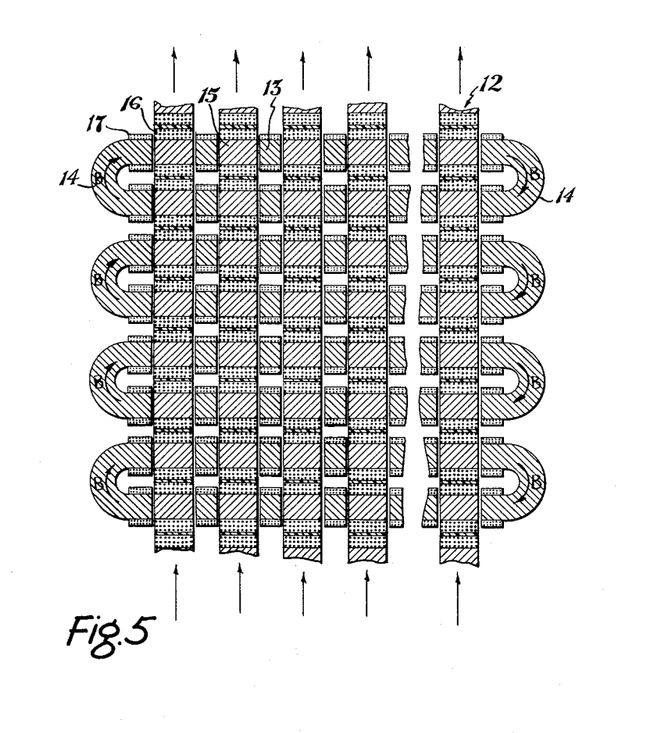
FIG. 5 is a view similar to that of FIG. 1 and showing a moving-coil multi-disk generator embodying the principles of the invention.

The generator shown in FIGS 1–4 is an inductor generator. The principles of the invention are equally applicable not only to other types of inductor generators, but also to moving pole or moving coil generators. One form of moving pole generator is shown in FIG. 5. Referring thereto, the generator therein shown includes a shaft (not shown) upon which are mounted a plurality of disks 12. Like the apparatus of FIGS. 1–4, the apparatus of FIG. 5 includes a plurality of magnetic circuits, but whereas the apparatus of FIGS. 1–4 included only three such circuits, the apparatus of FIG. 5 includes a greater number of magnetic circuits of which four are shown in FIG. 5 and each comprises stators 13 and end pieces 14 serially arranged to form the magnetic circuit. Within each disk 12 there are carried sectors 15 of magnetic material which are angularly spaced in symmetry about the axis of the shaft and which are shaped to correspond with the stators 13. These sectors 15 must be magnetized and therefore must either be composed of permanently magnetized material, such as ferroceram or alnico, or else field coils 16 must be provided. The sectors 15 are magnetized parallel to the axis of the shaft and with the direction of magnetization alternating among the sectors 15 of each disk 12. The sectors 15 of each disk 12 are in alignment, both as to angular position and as to magnetic orientation, with those of the other disks 12 so that, as the shaft rotates the magnetic flux in each of the magnetic circuits varies between a maximum in one direction and a maximum in the opposite direction. Armature coils 17 are provided so as to link the stators 13 as shown, and in other respects the embodiment of FIG. 5 does not differ greatly from that of FIGS. 1–4. In the device shown in FIG. 5 the armature coils are stationary while the field coils rotate, but it will be evident to those skilled in the art that the reverse arrangement will also function with the field coils stationary and the armature coils in rotation.

Figure 6:
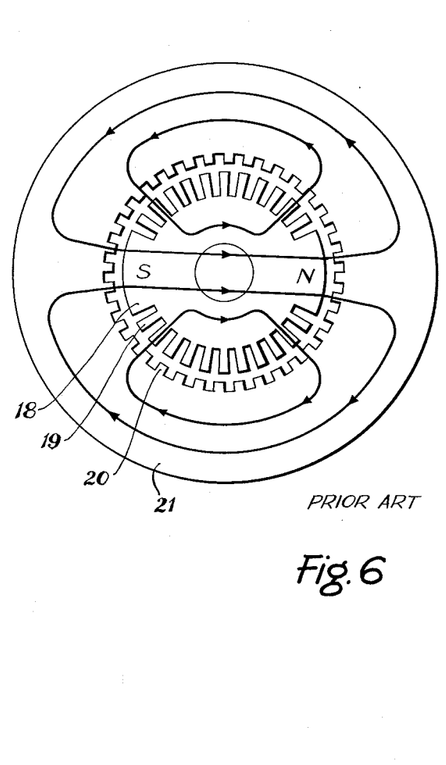
FIG. 6 is a diagrammatic view of a conventional two-pole A.C. generator.

It may assist in understanding the invention to compare the moving-coil generator of FIG. 5 with a conventional moving-coil generator, such as that shown diagrammatically in FIG. 6. Most electrical power machinery is built around the use of a cylindrical rotor, of which an example is shown at 18 in FIG. 6, whereas the present invention is built around the use of a series of closely spaced disks 12 (FIG. 5) held rigidly on a rotating shaft. In the conventional machine a magnetic circuit operates on only one moving part or element, namely, the cylindrical rotor 18; whereas in the present invention each single magnetic circuit is used to operate on a number of moving parts or elements, namely, the several disks 12. Moreover, in the conventional machine it may be said that only a portion of the magnetic circuit is fully utilized; that is to say, the magnetic lines of flux are not limited to the immediate region where the flux is cut, but must extend for a considerable length beyond it in order to form a closed magnetic circuit. For example, in a big turbogenerator the tubular region occupied by the rotor teeth 19 and the stator teeth 20 (that is, the region where the flux is cut) is the only useful part, but to support this region long lengths of magnetic flux lines are required, as shown by the rotor body 18 and the stator core 21 in FIG. 6. Some large turbo generators of conventional cylindrical design may have magnetic lines up to ten or more feet long. In accordance with the present invention, on the other hand, virtually all of the region of the magnetic circuit may be filled with useful activity.

Looking at the matter from a slightly different point of view, the iron in the armature and rotor teeth is the iron most intimately associated with the cutting of the magnetic lines of force and therefore is the iron most intimately associated with the production of the electric power output. Inspection of FIG. 6 shows that the iron in these teeth forms only a small fraction of the total amount of iron in the generator. On the other hand, inspection of FIG. 5 shows that the iron in the rotor and stator teeth forms by far the larger part of the total amount of iron in the multi-disk type of generator. Thus it appears that the multi-disk design makes it possible to reduce greatly the amount of iron required per kilowatt of power output.

The disks 12 which are characteristic of all embodiments of the invention are naturally arranged in parallel planes quite analogous to the so-called equipotential "planes" of an electrostatic belt-type generator, which is specially designed for high voltage operation by using equipotential planes to keep the electric field in the right configuration for sustaining high voltages. The invention takes the electrical configuration of such a high-voltage electrostatic generator and converts equipotential "planes" into energy-transfer means which can be stacked very closely together so as to utilize virtually the entire volume of the apparatus for energy transfer. The mechanical energy is introduced by rotating disks lying in equipotential planes and separated by insulating magnetic cores; moreover, cumulative magnetic leakage along the axis of the machine as a whole is avoided by also introducing magnetomotive force at frequent intervals, just as the mechanical energy is introduced at frequent intervals, along the axis. In like manner armature coils are provided at frequent intervals for the generation of electrical energy.

Figure 7:
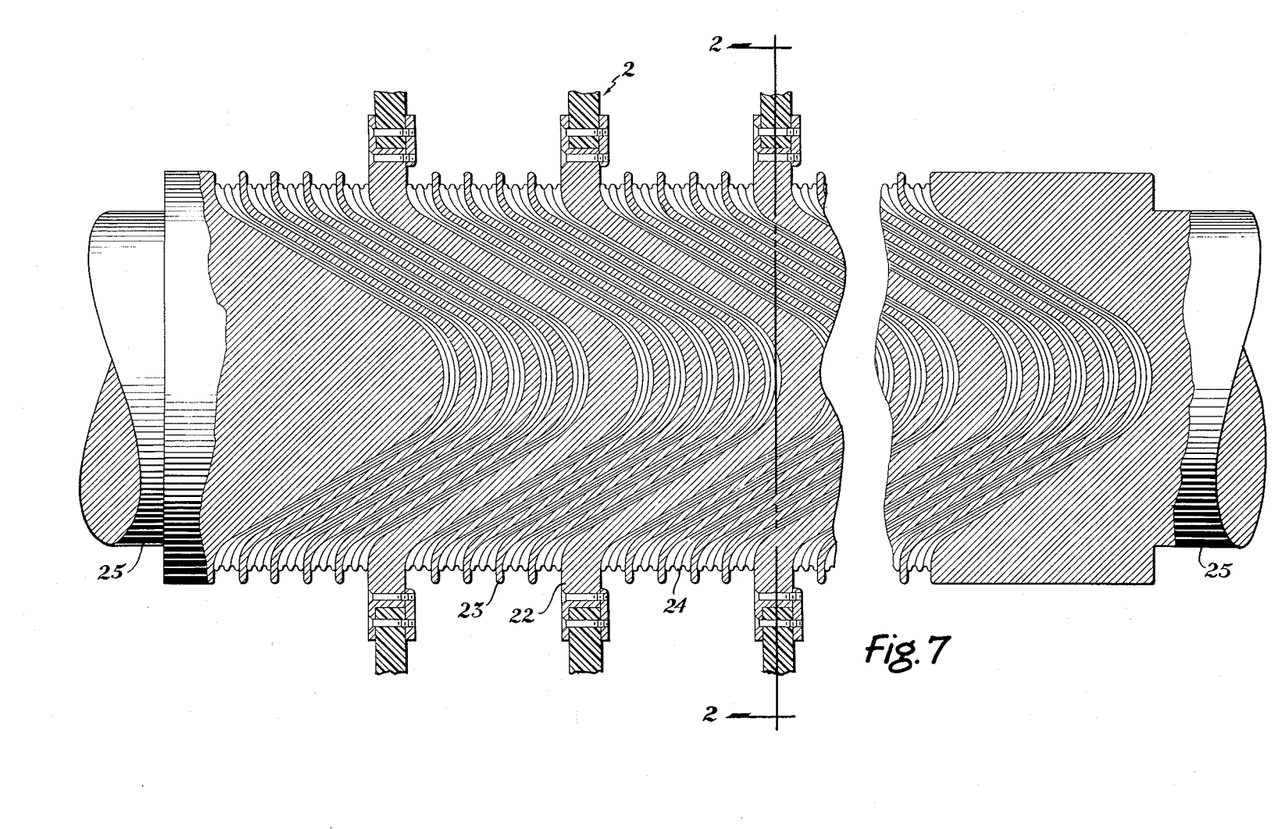
FIG. 7 is a side elevation, partly in longitudinal central section, of an insulating shaft for the high voltage multi-disk generator of FIGS. 1–4 and embodies certain principles of the invention.

For high voltage power, an important component of the invention is the shaft upon which the disks are mounted, such as the shaft 1 of FIGS. 1–4. This shaft must be very strong not only mechanically but also electrically. A shaft suitable for use for high voltage with the invention is shown in FIG. 7. Referring thereto, the disks 2 of the apparatus of FIGS. 1–4 are mounted upon thick metal members 22 which are dished as shown and are mutually separated by a series of alternating thin metal members 23 and insulating layers 24. The shaft 1 terminates at each extremity in solid metal cylinders 25 which are separated from the nearest thick metal member 22 in the same manner as that in which adjacent thick metal members 22 are separated from one another. The more acute the angle of dishing, the greater the mechanical strength. The metal members 22, 23 provide the mechanical strength and could be of high quality steel. The insulating layers 24 provide the electrical insulation and may be, for example, formed of laminated fiber glass, wherein layers of fiber glass are impregnated with an epoxy resin.

In the shaft of the invention, the electric field is perpendicular to the laminations in the insulating layer 24, so that maximum insulation is provided. Moreover, any bending moment results in a force compressive perpendicular to the laminations, so that the bending moment is not limited by any tendency to pull the laminations out, but only by plastic flow; there is virtually no tension on any glued seal. Therefore, the shaft tends to approximate the mechanical properties of the metal rather than those of the insulating layer 24.

The shaft of the invention loses very little in reduction of flashover length, since the dishing effect does not affect the distance between equipotential planes at the periphery of the shaft; moreover, the thin metal members 23 taper to very thin dimensions at the periphery of the shaft, so that only the thickness of the thick metal members 22 appreciably reduces the possible axial insulator flashover length, and the resultant reduction is about one-fifth. The shaft of the invention also provides voltage subdivision and is well suited to the provision of protective spark gaps at frequent intervals as protection against surges. The shaft of the invention also includes means for connecting it electrically with the rest of the generator; in an electrostatic belt-type generator, for example, voltage-dividing resistors are required in the column, since the belt cannot be used to directly control the potential distribution along the column. Moreover the solid insulator in the shaft of the invention has a good electrical factor of safety because edge effects are much reduced and the voltage gradient is perpendicular to the laminations; and the total voltage across any given thickness is small. The dishing effect is taken in a way so as to minimize curvature effects. For example, near the axis of the shaft the radius of curvature of the conductive surfaces is large compared with the thickness of the insulating material.

Figure 8:
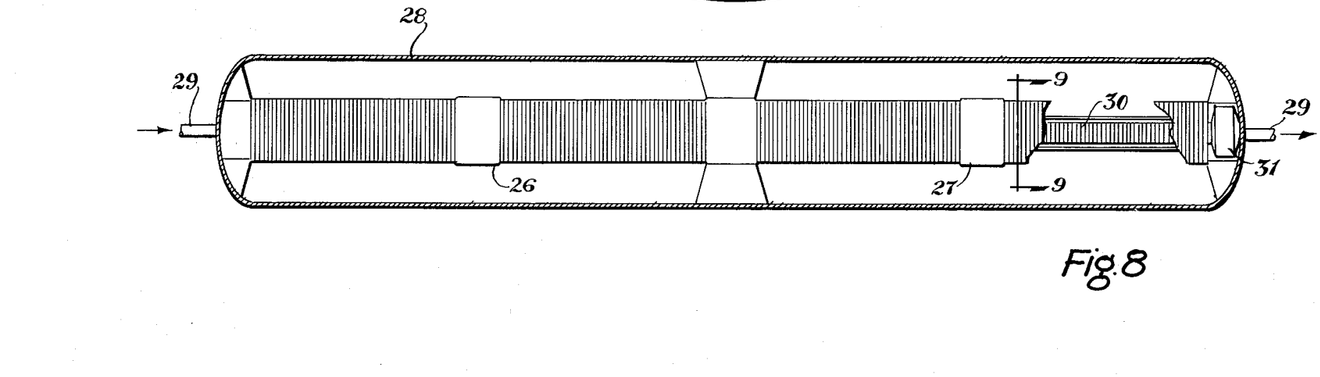
FIG. 8 is a longitudinal section showing a preliminary design of a three-stage tandem accelerator, powered by two multi-disk electromagnetic generators of the type shown in FIGS. 1–4 each rated at 10,000 kilovolts D.C. and 200 kilowatts.
Figure 9:
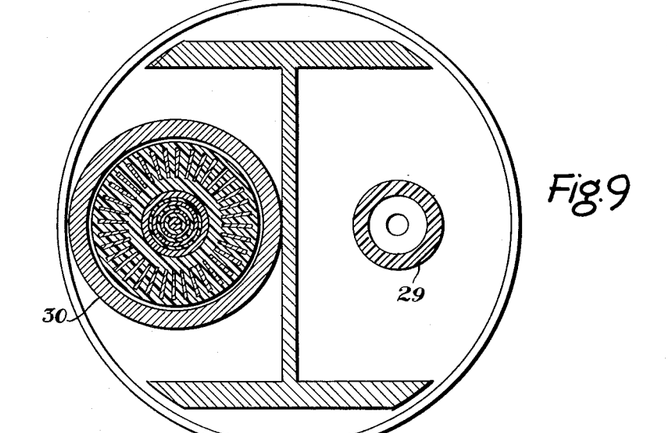
FIG. 9 is an enlarged transverse section through the column of the accelerator shown in FIG. 8.

Referring now to FIGS. 8 and 9, therein is shown a preliminary design for a 30–Mev., 3-stage tandem-type particle accelerator the construction of which is at present being contemplated. This accelerator will embody some of the teachings of my copending application, Serial Number 844,711, and reference should be made to that application for a more complete description of the apparatus of FIGS. 8 and 9. For the purposes of the present application it will suffice to say that the apparatus of FIGS. 8 and 9 includes a negative high-voltage terminal 26 and a positive high-voltage terminal 27 enclosed within a tank 28 filled with an insulating gas under pressure. An evacuated acceleration tube 29 extends the length of the device so that particles may travel therethrough. Neutral particles are injected into the acceleration tube 29 at the left-hand extremity thereof as shown in FIG. 8 and travel into the negative high-voltage terminal 26 within which some of them become negatively charged. These negatively charged particles are then accelerated in the acceleration tube 29 to the positive high-voltage terminal 27, where some of them are converted into positively charged particles and then accelerated through the remainder of the acceleration tube 29. Each of the high voltage terminals 26, 27 may be maintained at high voltage by a high voltage generator constructed in accordance with the invention, such as that shown in FIGS. 1–4, and the column of the accelerator of FIG. 8 has been partly broken away to show one such high-voltage generator at 30 the shaft of which is driven by a suitable motor which may be mounted as shown at 31. It will be noted that the size, shape, and construction of the generator of the invention is very well suited to such an accelerator and makes possible the construction of very high voltage D.C. accelerators of hitherto unattained power output. Thus, for example, the generator 30 in the apparatus of FIGS. 8–9 could be rated at 10,000 kilovolts with a power output of 200 kilowatts. The high voltage and power of this accelerator would be valuable not only for nuclear research but also for the large scale production of radioisotopes. In this connection it should be noted that the highest voltage of any single present mechanical electromagnetic generator is about 50 kilovolts.

Figure 10:
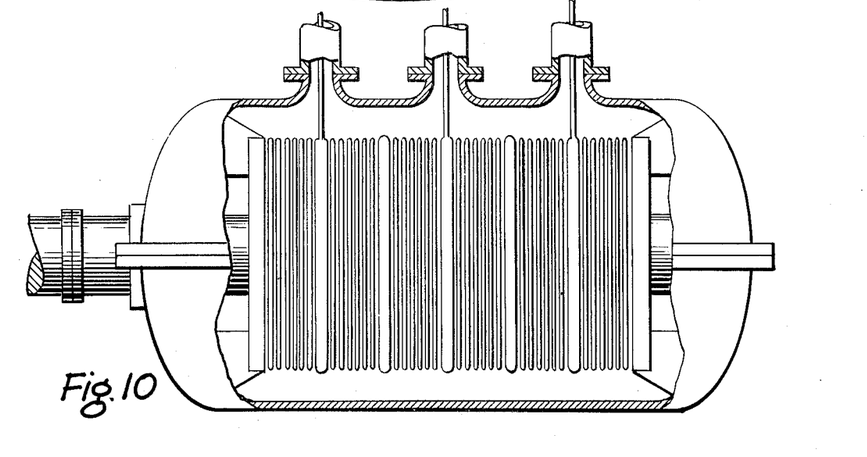
FIG. 10 is a longitudinal section of a 3-phase high voltage A.C. generator for power transmission embodying the principles of the invention.

Since present electromagnetic generators are limited to voltages too low for long distance power transmission, high voltage power for this purpose must now be produced in two stages by the use of (1) a low voltage generator and (2) a high voltage transformer. In accordance with the invention, the transformer may be eliminated and, in addition, the weight of the generator may be reduced. Thus the invention not only eliminates one of two items of electromagnetic machinery previously necessary for this purpose, but reduces the weight of the single unit remaining. A power generator designed in accordance with the invention for this purpose and for producing without transformation an output of 230 kilovolts at 3-phase, and 60 cycles per second, is shown in FIG. 10.

While the invention has been described with particular reference to electromagnetic generators, the invention is not limited thereto but includes motors and electromechanical control devices. The modification of the generators described herein so as to convert them to motors or electromechanical control devices is within the capabilities of those skilled in the art. For example, if alternating current is fed into the bottom row of armature coils 7 and also into the third row of armature coils 7 from the bottom of the apparatus shown in FIG. 1 and if all other coils are disconnected, the apparatus will operate as a synchronous motor. Similarly, if controlled, D.C. pulses are fed into the armature coils 7 of the apparatus shown in FIGS. 1–4 and if the field coils 9 and excitation coils 11 are disconnected, the disks 2 may be caused to rotate in a controlled way so as to advance, if desired, by incremental amounts as small as the distance between adjacent sectors 5. The apparatus of FIG. 5 may be modified by changes of similar simplicity so as to form a motor or an electromechanical control device.

Generators of the type described and claimed herein are well adapted to the production of power, either high voltage or low voltage, and especially to D.C. power. At the same time a great saving in iron can be effected by reduction of the return magnetic circuit.

Also, the magnetic circuits can be operated at a much higher frequency than 60 cycles so that accompanying reductions in the amount of iron needed can be made for this reason. In addition, by use of a tapered disk construction very high speeds of rotation could be used. The use of the increased frequency in the magnetic circuits means more volts per turn in the armature, with corresponding reductions in copper losses. Thus the principles of this invention offer possibilities for the improved production of electric power in many fields, including the production of large amounts of D.C. power at very high voltages for transmission to great distances.

Throughout the specification and claims the term "magnectic" is used to designate a material capable of being magnetized whether or not actually so magnetized.

Having thus described the principles of the invention together with several illustrative embodiments thereof, it is to be understood that although specific terms are employed they are used in a generic and descriptive sense and not for purposes of limitation, the scope of the invention being set forth in the following claims.

I claim:

1. Electromagnetic machinery comprising in combination a rotatable insulating shaft, a series of axially spaced disks mounted on said shaft, at least one elongated magnectic circuit lying generally parallel and close to said shaft, whereby the magnetic flux lines of said magnetic circuit are intersected by said disks, said magnetic circuit including a first axially-spaced series of pluralities of angularly spaced magnetic sectors, said disks including magnetic sectors which form a second axially-spaced series of pluralities of angularly spaced magnetic sectors interspersed among said first series, a series of layers of insulation introduced in said magnetic circuit transverse to the axis of said shaft, a series of armature coils linking said magnetic circuit and interspersed among said layers of insulation with series connections across said layers of insulation, whereby, upon rotation of said shaft with respect to said first series, the movement of magnetic sectors in said second series between magnetic sectors of said first series causes a variation in the magnetic flux linked by said armature coils, a series of sources of magnetomotive force interspersed among said disks, and means for rotating said shaft with respect to said first series whereby mechanical power used in producing such rotation is transformed into high-voltage electrical energy.

2. Electromagnetic machinery comprising in combination a rotatable insulating shaft, a series of axially spaced disks mounted on said shaft, at least one elongated magnetic circuit lying generally parallel and close to said shaft, whereby the magnetic flux lines of said magnetic circuit are intersected by said disks, said magnetic circuit including an axially-spaced series of pluralities of angularly spaced magnetic sectors, said disks including axially magnetized sectors which form an axially-spaced series of pluralities of angularly spaced axially magnetized sectors interspersed among said series of pluralities of magnetic sectors, a series of layers of insulation introduced in said magnetic circiut transverse to the axis of said shaft, a series of armature coils linking said magnetic circuit, and interspersed among said layers of insulation with series connections across said layers of insulation, whereby, upon rotation of said shaft with respect to said magnetic sectors, the movement of magnetized sectors between magnetic sectors causes a variation in the magnetic flux linked by said armature coils, and means for rotating said shaft with respect to said magnetic sectors whereby mechanical power used in producing such rotation is transformed into high-voltage electrical energy.

3. Electromagnetic machinery comprising in combination a rotatable insulating shaft, a series of axially spaced disks mounted on said shaft, at least one elongated magnetic circuit lying generally parallel and close to said shaft, whereby the magnetic flux lines of said magnetic circuit are intersected by said disks, said magnetic circuit including a first axially-spaced series of pluralities of angularly spaced magnetic sectors, said disks including magnetic sectors which form a second axially-spaced series of pluralities of angularly spaced magnetic sectors interspersed among said first series, a series of layers of insulation introduced in said magnetic circuit transverse to the axis of said shaft, a series of units each comprising at least one armature coil linking said magnetic circuit and at least one rectifier and interspersed among said layers of insulation with series connections across said layers of insulation, whereby, upon rotation of said shaft with respect to said first series, the movement of magnetic sectors in said second series between magnetic sectors of said first series causes a variation in the magnetic flux linked by said armature coils, a series of sources of magnetomotive force interspersed among said disks, and means for rotating said shaft with respect to said first series, whereby mechanical power used in producing such rotation is transformed into high-voltage D.C. electrical energy.

4. Electromagnetic machinery comprising in combination a rotatable insulating shaft, a series of axially spaced disks mounted on said shaft, at least one elongated magnectic circuit lying generally parallel and close to said shaft, whereby the magnetic flux lines of said magnetic circuit are intersected by said disks, said magnetic circuit including an axially-spaced series of pluralities of angularly spaced magnetic sectors, said disks including axially magnetized sectors which form an axially-spaced series of pluralities of angularly spaced axially magnetized sectors interspersed among said series of pluralities of magnetic sectors, a series of layers of insulation introduced in said magnetic circuit transverse to the axis of said shaft, a series of units each comprising at least one armature coil linking said magnetic circuit and at least one rectifier and interspersed among said layers of insulation with series connections across said layers of insulation, whereby, upon rotation of said shaft with respect to said magnetic sectors, the movement of magnetized sectors between magnetic sectors causes a variation in the magnetic flux linked by said armature coils, and means for rotating said shaft with respect to said magnetic sectors whereby mechanical power used in producing such rotation is transformed into high-voltage electrical energy.

5. Electromagnetic machinery comprising in combination a rotatable insulating shaft comprising a multiplicity of alternating dished conductive members and correspondingly dished insulating members in nesting relationship, said conductive members being much more rigid than said insulating members, a series of axially spaced disks connected electrically and mechanically to at least some of said conductive members of said shaft, at least one elongated magnetic circuit lying generally parallel and close to said shaft, whereby the magnetic flux lines of said magnetic circuit are intersected by said disk, said magnetic circuit including a first axially-spaced series of pluralities of angularly spaced magnetic sectors, said disks including magnetic sectors which form a second axially-spaced series of pluralities of angularly spaced magnetic sectors interspersed among said first series, a series of layers of insulation introduced in said magnetic circuit transverse to the axis of said shaft, a series of armature coils linking said magnetic circuit and interspersed among said layers of insulation with series connections across said layers of insulation, whereby, upon rotation of said shaft with respect to said first series, the movement of magnetic sectors in said second series between magnetic sectors of said first series causes a variation in the magnetic flux linked by said armature coils, a series of sources of magnetomotive force distributed along said magnetic circuit, and means for rotating said shaft with respect to said first series whereby mechanical power used in producing such rotation is transformed into high-voltage electrical energy.

6. Electromagnetic machinery comprising in combination a rotatable insulating shaft, comprising a multiplicity of alternating dished conductive members and correspondingly dished insulating members in nesting relationship, said conductive members being much more rigid than said insulating members, a series of axially spaced disks connected electrically and mechanically to at least some of said conductive members of said shaft, at least one elongated magnetic circuit lying generally parallel and close to said shaft, whereby the magnetic flux lines of said magnetic circuit are intersected by said disks, said magnetic circuit including an axially-spaced series of pluralities of angularly spaced magnetic sectors, said disks including axially magnetized sectors which form an axially-spaced series of pluralities of angularly spaced axially magnetized sectors interspersed among said series of pluralities of magnetic sectors, a series of layers of insulation introduced in said magnetic circuit transverse to the axis of said shaft, a series of armature coils linking said magnetic circuit and interspersed among said layers of insulation with series connections across said layers of insulation, and means for rotating said shaft with respect to said magnetic sectors whereby mechanical power used in producing such rotation is transformed into high-voltage electrical energy.

7. An inductor generator including a shaft upon which are mounted a plurality of disks of insulating material and including M magnetic circuits each comprising pairs of stators and end pieces, two pairs of stators being arranged between each pair of adjacent disks, field coils adapted to introduce magnetomotive force into each magnetic circuit so that the direction of the magnetic flux is in one direction in one such pair of stators and in the opposite direction in the other such pair of stators at all times; sectors of magnetic material mounted within each disk and angularly spaced in symmetry about the axis of the shaft and in alignment with those of the other disks; the transverse surfaces of the stators and the end pieces which face the transverse surface of a disk being provided with sector-shaped teeth the end surfaces of which are shaped to correspond with the sectors in the disks; said teeth being in alignment with those which are axially but not angularly displaced with respect thereto and being angularly spaced about the axis of the shaft but not in symmetry, the teeth of the two pairs of stators between each adjacent pair of disks in each magnetic circuit being angularly displaced in such a manner that when sectors in the disks are in alignment with the teeth of one stator in each pair, there are no sectors in alignment with the teeth of the other stator in each pair, whereby, as the shaft rotates, the magnetic flux in the magnetic circuit "swings" back and forth between the two stators in each pair; and armature coils wound about the individual stators, whereby the magnetic flux which they link varies as the magnetic flux swings from one stator to the other in each pair and an electromotive force is thus produced in each armature coil.

8. A generator according to claim 7, wherein said field coils are mounted at frequent intervals along the magnetic circuit.

9. A generator according to claim 7, wherein excitation coils are provided to generate the voltage to energize the field coils.

10. A generator in accordance with claim 7, wherein one or more rectifiers are connected in series with each armature coil.

11. A generator in accordance with claim 7, wherein the teeth of the sectors of the magnetic circuits are angularly displaced a small amount from a symmetrical disposition of the magnetic circuits, whereby the phase of each magnetic circuit is displaced with respect to those of the others.

12. A generator according to claim 7, wherein layers of insulating material are introduced into the magnetic circuit as follows: N such layers are introduced into each stator and serve electrically to separate $N-1$ armature coils and two field coils, whereby each armature coil, together with any rectification or other apparatus intimately associated therewith, is electrically independent of the rest of the apparatus and comprises a power unit.

13. A generator according to claim 10, wherein the armature coils between adjacent disks are all connected in a helical manner in series, so that the bottom armature coil of one stator is connected in series with the bottom armature coil of the adjacent stator and so on through 4M stators and then sequentially through the middle armature coils of the same 4M stators and thence through the upper armature coils of the same 4M stators, whereby $4M(N-1)V$ kilovolts can be generated between each pair of adjacent disks, and the output of the whole generator will then be $4M(N-1)(r-1)V$ kilovolts, where $r$ is the number of disks and V is the voltage in kilovolts generated by each armature coil.

14. A moving-pole electromagnetic high-voltage generator comprising in combination an insulating shaft, disks mounted on said shaft at intervals therealong, said disks including magnetized material having poles, magnetic members mounted in the spaces between said disks, at least some of said magnetic members having layers of electric insulation disposed across said magnetic circuit, armature coils imbeded in said magnetic members and connected in series across said disks, said magnetic members being axially aligned so as to provide, in conjunction with the poles of said disks, at least one elongated magnetic circuit lying generally parallel and close to said shaft, end pieces of magnetic material mounted beyond the end disks, respectively, so as to complete said magnetic circuits, and means for effecting relative rotational movement between said shaft and said magnetic members.

15. An inductor electromagnetic high-voltage generator comprising in combination an insulating shaft, disks mounted on said shaft at intervals therealong, said disks including teeth of magnetic material protruding axially and extending radially, magnetized members in the spaces between said disks and having teeth protruding axially and extending radially, at least some of said magnetic members having layers of electric insulation disposed across said magnetic circuit, said magnetized members being axially aligned so as to provide, in conjunction with the teeth of said disks, at least one elongated magnetic circuit lying generally parallel and close to said shaft, end pieces of magnetic material mounted beyond the end disks, respectively, so as to complete said magnetic circuits, armature coils wound around said magnetized members and connected in series across said disks, and means for effecting relative rotational movement between said shaft and said magnetic members.

References Cited by the Examiner

UNITED STATES PATENTS

| | | | |
|---|---|---|---|
| 911,081 | 2/1909 | Smoot et al. | 310—262 |
| 1,211,617 | 1/1917 | Newland. | |
| 1,301,077 | 4/1919 | Pennington | 310—168 |
| 1,315,782 | 9/1919 | Leggett | 64—1 |
| 2,307,604 | 1/1943 | Pollard | 310—168 |
| 2,479,589 | 8/1949 | Parker | 310—268 X |
| 2,497,113 | 2/1950 | Curry | 310—168 |
| 2,599,575 | 6/1952 | Morgan | 64—1 |
| 2,743,375 | 4/1956 | Parker | 290—52 |
| 2,864,964 | 12/1958 | Kober | 310—268 |
| 2,892,144 | 6/1959 | Kober | 310—268 |

ORIS L. RADER, *Primary Examiner.*

MILTON O. HIRSHFIELD, *Examiner.*